United States Patent [19]

Juy

[11] 4,440,440
[45] Apr. 3, 1984

[54] SADDLE ROD FOR BICYCLES AND LIKE VEHICLES

[75] Inventor: Henry Juy, Dijon, France

[73] Assignee: Etablissements le Simplex, France

[21] Appl. No.: 271,200

[22] Filed: Jun. 8, 1981

[51] Int. Cl.³ .............................................. B62J 1/00
[52] U.S. Cl. ...................................... 297/195; 403/87
[58] Field of Search .................... 292/195; 403/82, 90, 403/84, 87, 110, 121; 248/299, 286; 280/281 R

[56] References Cited

U.S. PATENT DOCUMENTS

| | | | |
|---|---|---|---|
| 1,304,561 | 5/1919 | Gulesian | 403/84 |
| 1,446,164 | 2/1923 | D'Eyraud | 403/87 |
| 1,578,634 | 3/1926 | Borgmann | 248/299 X |
| 3,992,054 | 11/1976 | Campagnolo | 297/195 |
| 4,142,813 | 3/1979 | Laborde | 403/87 X |
| 4,155,590 | 5/1979 | Cunningham | 297/195 |
| 4,273,461 | 6/1981 | Kjellstrand | 403/90 X |
| 4,275,922 | 6/1981 | Juy | 297/195 |

FOREIGN PATENT DOCUMENTS

| | | | |
|---|---|---|---|
| 2451310 | 10/1980 | France | 297/195 |
| 2480697 | 10/1981 | France | 297/195 |

*Primary Examiner*—William E. Lyddane
*Assistant Examiner*—Peter A. Aschenbrenner
*Attorney, Agent, or Firm*—Eric P. Schellin

[57] ABSTRACT

A saddle rod for bicycles and like vehicles which is in the form of a tube that is engaged and secured within a mating tube of a cycle frame. A head is affixed to the upper end of the tube and a carriage formed of two clamping flanges for the wires of the saddle frame, is connected to the head by a single screw for assembling the elements. Hence, the saddle relative to the saddle rod is secured after lengthwise and angular adjustment.

6 Claims, 10 Drawing Figures

SADDLE ROD FOR BICYCLES AND LIKE VEHICLES

BACKGROUND OF THE INVENTION

1. Field of Invention

The invention relates to a saddle rod for bicycles and like vehicles.

2. Summary of Invention

The object of the invention belongs to the technical field of accessory parts for cycles and like vehicles.

In accordance with the invention, it has been contemplated to make a novel saddle rod of the type comprising a tube which is engaged and secured within the mating tube of the cycle frame, a head made fast directly with or built in on the upper end of the tube, and a carriage consisting of two clamping elements for the wires of the saddle frame and connected to the head by a single screw for assembling the elements and securing in position after lengthwise and angular adjustment of the saddle relative to the saddle rod.

The saddle rod in accordance with the invention can be manufactured economically, as the elements making up same are obtained with a minimum of machining, and have relatively simple shapes, imparting to the saddle rod substantial strength, safety and reliability.

According to a first characteristic, the saddle rod of the invention is remarkable, in that the upper end of the top end of the saddle rod tube has directly or in a built-in manner, a spherical head with a passage bore extending axially therethrough for a screw assembling the head with a carriage equipped for securing the saddle frame wires, the lower face of which has a spherical cap for resting on and contacting the spherical head.

A further characteristic is that the passage bore for the assembling screw extends vertically through the spherical head and is hourglass shaped with an approximately circular section at the center of the sphere with a diameter slightly higher than the diameter of the screw, and egg-shaped and flared sections toward the periphery of the sphere and in the lengthwise direction, for permitting the angular motions of the assembling screw in the longitudinal direction only.

These and other characteristics will be apparent from the following description and drawings.

The object of the invention will be better understood, without however restricting it thereby, as in the attached drawings wherein:

Figure 1:
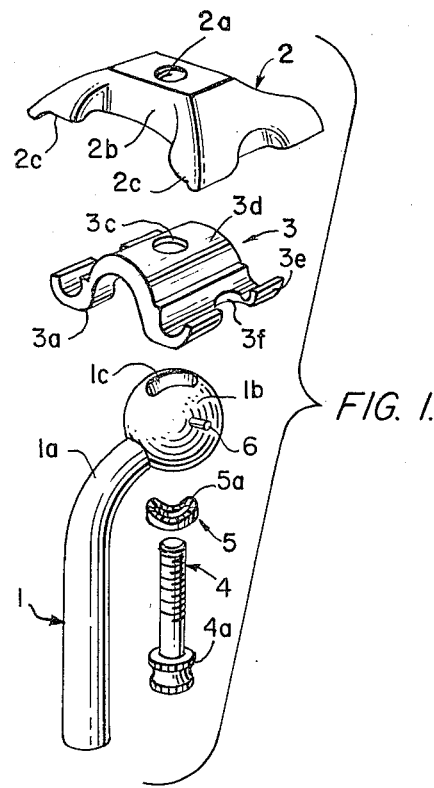
FIG. 1 is a perspective view separately illustrating the elements which make up the saddle rod in accordance with the invention.

In order to make it more readily apparent, the object of the invention will be described now in the forms of embodiment illustrated in the Figures of the drawings, without however being limited thereby.

DETAILED DESCRIPTION OF PREFERRED EMBODIMENTS

The saddle rod illustrated as an example, mainly comprises: a saddle rod tube 1, the curved upper end of which 1a, has directly from manufacture or in a built-in manner a spherical head 1b, a saddle carriage in this example has two upper and lower elements 2 and 3 respectively, the headcarriage unit being assembled by a screw 4 extending loosely through the head and the lower flange, and being threaded at 2a into the upper flange 2.

The spherical head 1b is drilled axially and vertically by a bore 1c which is hourglass-shaped with an approximately circular section at the center of the sphere and a diameter slightly higher than the diameter of the screw 4, and egg-shaped and flared sections toward the periphery of the sphere and in the lengthwise direction, so that the screw 4 may be displaced angularly in this direction for the angular adjustment of the saddle.

To prevent a transverse shifting of the carriage relative to the spherical head 1b, as well as rotatory motion of this carriage around the screw 4, additional transverse stop means have been provided both on the spherical head 1b and on the lower element 3 of the carriage, as will be apparent later on in the description.

Figure 4:
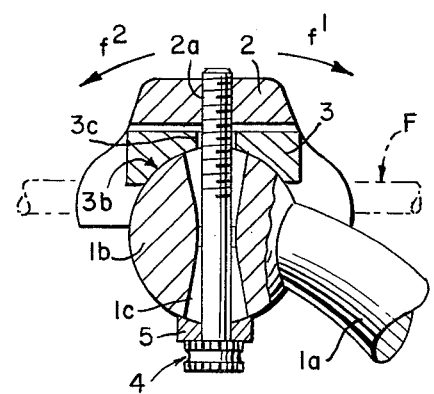
FIG. 4 is a view in longitudinal section considered along line 4—4 in FIG. 3.
Figure 5:
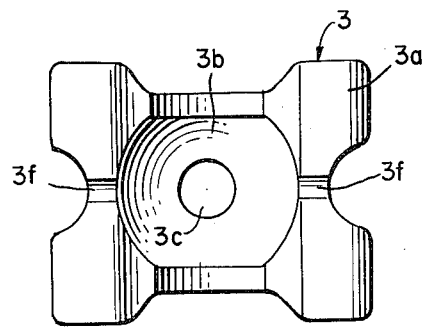
FIGS. 5 and 6 are respectively a bottom view and a plane view of the carriage element provided with a spherical cap.
Figure 6:
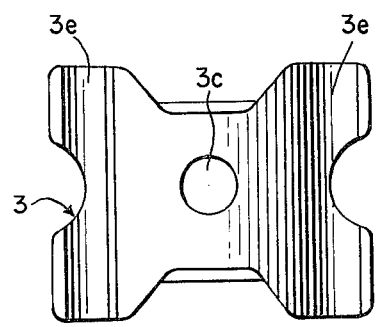
Figure 7:
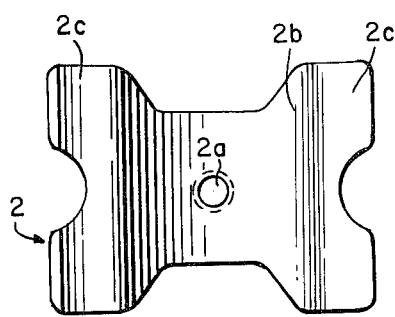
FIGS. 7 and 8 are respectively a bottom view and a plane view of the other carriage element.
Figure 8:
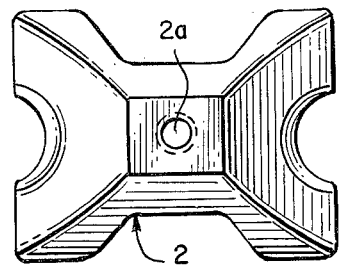

The lower element 3 has on the lower face 3a thereof a spherical cap 3b for capping the spherical head 1b, with a hole 3c in the center for the passage with tolerance of the screw 4 (FIG. 5). The central portion 3d in which the spherical cap 3b is provided, is convex constituting the necessary front and rear clearances for the passage of the curved end 1a of the saddle tube in the front maximum angular position (in the direction shown by arrow f1, FIG. 4).

On the lateral sides of the central portion 3d, the lower element 3 has, in a known manner, recesses 3e for receiving the wires F of the saddle frame (not shown).

The upper element 2 has a concave lower central face 2b for mating without contact and at least in part the central portion 3d of the lower flange. Externally, on either side of the face 2b, the upper flange has plane or curved faces 2c for resting on and contacting the wires F of the saddle frame.

Figure 3:
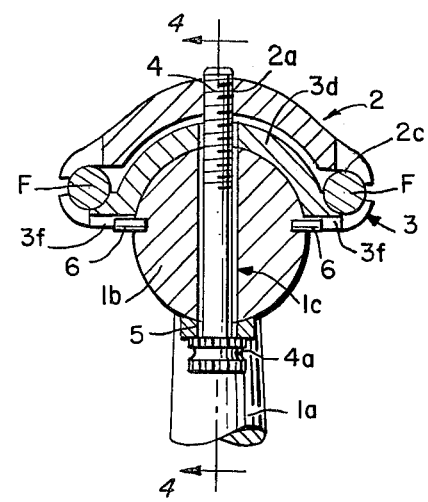
FIG. 3 is a cross-sectional view of the assembled saddle rod.
Figure 2:
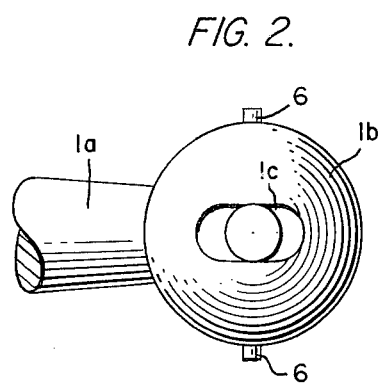
FIG. 2 is a plane view on a larger scale of the spherical head of the saddle rod.

As there may be seen best from FIGS. 3 and 4 of the drawings, when it is desired to longitudinally adjust the position of the saddle relative to the saddle tube, it will merely be necessary to make free the upper element 2 by actuating the screw 4 which has for this purpose a polygonal or cylindrical hollow hexagonal actuation head 4a, which makes it possible to allow the saddle frame wires F to slide on the recesses 3e. By the same actuation of the screw 4, it is possible to adjust the angular position in the same lengthwise direction of the carriage relative to the spherical head 1b, thanks to the angular shifting of the screw 4 in the orifice 1c (along arrow f1 or f2, FIG. 4).

It will be noted that there is preferably interposed between the screw head 4a and the spherical head 1b, a washer 5 with a bearing surface 5a in the form of a spherical cap in the direction of the sphere, some roughness (serrations, grooves . . . ) being possibly provided on this surface for reinforcing the clamping action.

As referred to hereinbefore, complementary stop means are provided to prevent transversal inclinations of the carriage relative to the spherical head, as well as the rotatory movements of the carriage around the screw 4.

A first form of embodiment of these means has been illustrated in FIGS. 1, 2, 3 and 5 of the drawings, where it may be seen that the spherical head 1b, on the axis thereof at two locations diametrally opposed in the transversal direction, has studs or similar projections 6, which are built in on the sphere directly from manufacture, while recessed imprints 3f are provided on the lower face 3a of element 3, the imprints covering at least for a half diameter, the studs 6 and having a depth which is conveniently selected so that the spherical cap 3b of the element will always be in contact with the sphere, and that there will permanently be a normal operational clearance between the bottom of the imprints 3f and the studs 6.

Figure 9:
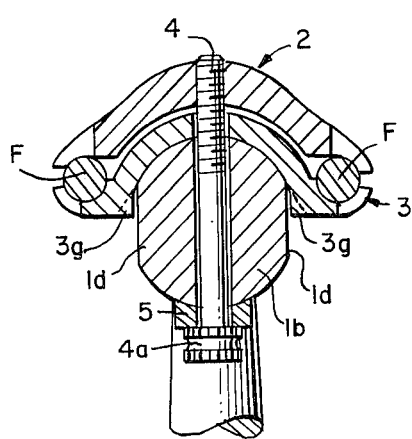
FIG. 9 is a cross-sectional view illustrating an alternative form of embodiment of the transversal angular stop of the carriage on the head.
Figure 10:
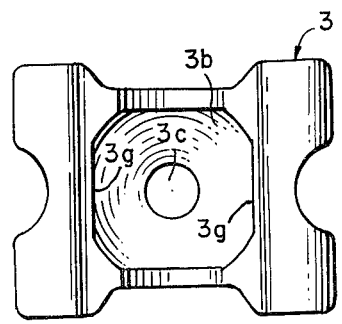
FIG. 10 is a bottom view of the carriage element provided with a spherical cap in accordance with FIG. 9.

In accordance with a further form of the embodiment illustrated in FIGS. 9 and 10, the complementary stop means consist of opposed parallel flat portions 1d and of bosses 3g provided on the element 3 of either side of the spherical cap, always taking into account the operational clearances.

The advantages are clearly apparent from the description.

The invention is not limited in any way to the details of use and of construction or design of its various parts which have been more particularly shown herein; on the contrary, all the alternative forms of embodiment are included within the scope of the invention.

What is claimed is:

1. A saddle rod for bicycles and the like, comprising:
   a saddle tube (1) having a spherical head (1b);
   a head carriage unit having a lower element (3) forming a spherical cap (3b) which rests upon said spherical head, said head carriage unit encases the wires of a saddle frame;
   a screw passing through said spherical head secures said head carriage unit to said saddle tube; and
   said spherical head is provided with a vertical bore (1c) for said screw, having an hourglass shape with an approximate circular section at the center of said bore, the diameter of said circular section is slightly larger than the diameter of said screw passing therethrough, wherein said vertical bore is further provided with egg-shaped and flared sections at the periphery of the sphere in a lengthwise direction so that said screw can be angularly shifted and thereby said head carriage unit in the lengthwise direction only.

2. A saddle rod as defined by claim 1 wherein the lower element of said head carriage unit comprises a convex central portion defining a hole for the passage of said screw and having a lower face defining said spherical cap (3b), the lower element is also provided with lateral sides having recesses (3e) for receiving the wires of a saddle frame; and said head carriage unit further comprises an upper element having a means into which said screw is threaded, the upper portion is provided with lateral sides having curved faces (2c) for encasing with said recess the wires of a saddle frame; and a lower concave central portion (2b) which mates with the convex central portion of said lower element.

3. A saddle rod as defined by claim 2 further comprising a stop means which prevents said carriage unit from swinging relative to said spherical head in a crosswise direction, said stop means is provided at two opposed locations on said spherical head and beneath the lower element on either side of the spherical cap.

4. A saddle rod as defined by claim 3 wherein said stop means comprises studs (6) projecting from said sphere and the lower element is provided with recessed imprints (3f) which cover the studs, the recessed imprints are separated from the studs when said spherical cap is in contact with said spherical head by an operational clearance.

5. A saddle rod as defined by claim 3 wherein said stop means comprises opposed parallel flat portions (1d) on said spherical head and the lower element is provided with bosses (3g) along the edge of said spherical cap, the bosses are separated from the flat portions when said spherical cap is in contact with said spherical head by an operational clearance.

6. A saddle rod as defined by claim 3 further comprising a washer (5) having a spherical surface which rests on said spherical head, said screw is provided with a screw head, and the washer is fitted onto said screw, so that the washer is located between the screw head and the spherical head, the spherical surface is provided with reinforcement roughenings which clamp the spherical head to the screw.

* * * * *